No. 767,649. PATENTED AUG. 16, 1904.
N. T. LEVERITT.
TIRE TIGHTENER.
APPLICATION FILED DEC. 8, 1903.
NO MODEL.
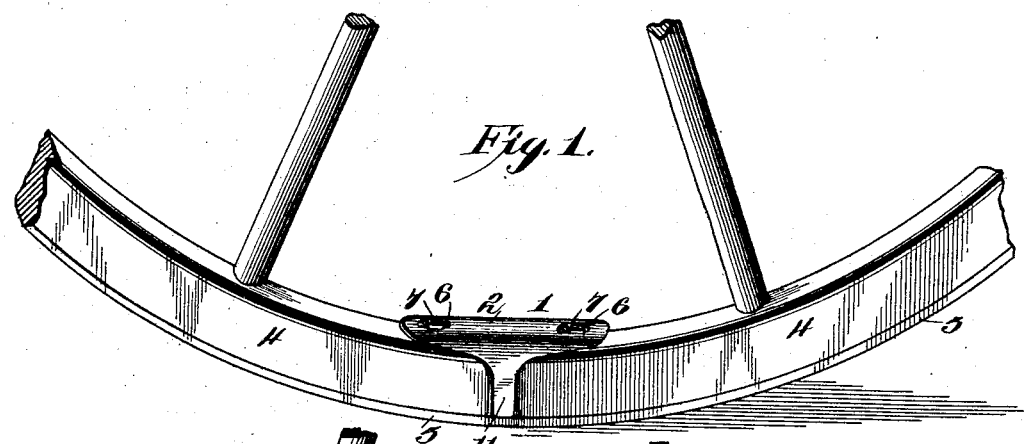
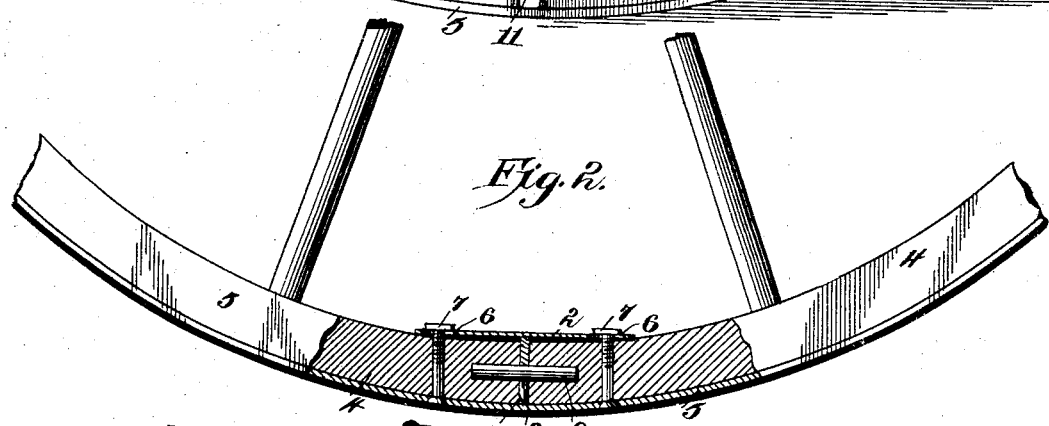
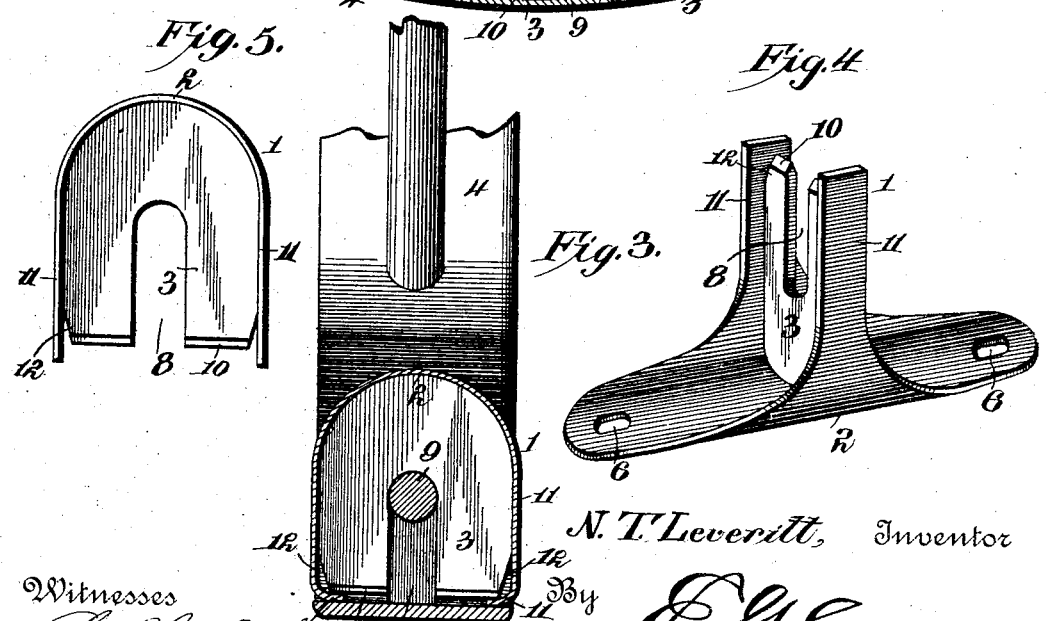
N. T. Leveritt, Inventor
Witnesses No. 767,649. Patented August 16, 1904.

UNITED STATES PATENT OFFICE.

NICHOLAS TOMPKINS LEVERITT, OF PARIS, TEXAS, ASSIGNOR OF ONE-HALF TO JAMES H. CAMERON, OF PARIS, TEXAS.

TIRE-TIGHTENER.

SPECIFICATION forming part of Letters Patent No. 767,649, dated August 16, 1904.

Application filed December 8, 1903. Serial No. 184,289. (No model.)

*To all whom it may concern:*

Be it known that I, NICHOLAS TOMPKINS LEVERITT, a citizen of the United States, residing at Paris, in the county of Lamar and State of Texas, have invented a new and useful Tire-Tightener, of which the following is a specification.

The invention relates to an improvement in tire-tighteners.

The object of the invention is to improve the construction of tire-tighteners and to provide a simple, inexpensive, and efficient device adapted to be readily applied to a wheel and capable of effectively tightening the tire thereof without straining or otherwise injuring the spokes and without dishing the wheel.

Another object of the invention is to provide a tire-tightener of this character which may be applied to a wheel without employing a wheelwright or other skilled mechanic.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the said drawings, Figure 1 is a perspective view of a portion of a wheel provided with a tire-tightener constructed in accordance with this invention. Fig. 2 is a longitudinal sectional view of the same. Fig. 3 is a transverse sectional view. Fig. 4 is a detail perspective view of the tire-tightener; and Fig. 5 is an end elevation of the same, illustrating the construction of the plate or wedge.

Like numerals of reference are employed to designate corresponding parts in the several views.

1 designates a tire-tightener comprising a clip 2 and a wedge or plate 3, arranged within the clip and adapted, as illustrated in Fig. 2 of the drawings, to be interposed between the adjacent ends of felly-sections 4 to take up any looseness of the same, whereby the felly is expanded to tighten the tire 5 of the wheel. One or more of the tire-tighteners may be applied to a wheel, and it will be readily apparent that the tire may be tightened to the desired extent. The clip consists of a transversely-curved plate or piece conforming to the configuration of the rounded inner face or edge of the felly-sections and provided at its ends with slots 6 for the reception of the tire-bolts 7. The slots are adapted to permit the tire to expand and contract without affecting the tire-tightener. The plate or wedge, which is disposed transversely of the rim of the wheel, may be fixed to the clip in any desired manner, and in practice it is preferable to construct the same of a thickness of about three-sixteenths of an inch; but it may be made of any desired thickness, as will be readily understood. The outer portion of the plate or wedge is provided with a slot or bifurcation 8 to permit it to straddle the tenon 9 of the felly-sections, and the side portions formed by the slot or bifurcation are oppositely beveled or tapered to form wedge-shaped portions 10 for enabling the plate or wedge to be readily inserted between the ends of the felly-sections. The tire-tightener may be readily driven into position and may be applied to a wheel without the aid of a skilled mechanic, and it is secured to the wheel by the adjacent tire-bolts thereof.

In order to increase the effectiveness of the tire-tightener and to enable the same to be securely clamped to the felly-sections, the clip is provided with sides or arms 11, which extend beyond the beveled side portions of the plate or wedge and which are flexible and adapted to be bent inward around the outer portions of the felly-sections, whereby the sides or arms of the clip firmly embrace the same. The extended side portions of the clip are bent inward and interposed between the outer faces or edges of the felly-sections and the inner face of the tire, as clearly indicated in Fig. 3 of the accompanying drawings, and the sides of the plate or wedge are cut away at 12 and spaced from the extended flexible portions of the sides or arms of the clip, as clearly shown in Fig. 5. By this construction the sides or arms of the clip may be readily bent inward to embrace the felly-sections.

It will be seen that the tire-tightener is exceedingly simple and inexpensive in construction, that it is adapted to be readily applied to a wheel, and that it is capable of effectively expanding the felly to tighten the tire to the desired extent. It will also be clear that it does not strain or otherwise injure or affect the strength of the spokes of a wheel and that it will expand a wheel without dishing the same.

What I claim is—

1. A tire-tightener, comprising a clip, and an interiorly-arranged transverse plate fixed to and carried by the clip and provided with a slot to enable the plate to straddle the tenon of the felly-sections, the sides of the clip being extended beyond the plate and arranged to be bent inward around the felly-sections between the latter and the tire, substantially as described.

2. A tire-tightener, comprising a clip having sides or arms, and an interiorly-arranged transversely-disposed plate fixed to and carried by the clip and having a tapered outer portion terminating short of the ends of the sides or arms, the latter being adapted to be bent inward around the ends of felly-sections, substantially as described.

3. A tire-tightener, comprising a transversely-curved clip slotted at its ends and having sides or arms, and an interiorly-arranged transverse plate fixed to and carried by the clip and having a slot or bifurcation and beveled at opposite sides thereof, said plate being provided with an outer tapered end terminating short of the sides or arms of the clip, substantially as described.

In testimony that I claim the foregoing as my own I have hereto affixed my signature in the presence of two witnesses.

NICHOLAS TOMPKINS LEVERITT.

Witnesses:
J. M. EARLY,
T. HONAYEAD.